(12) United States Patent
Kylväjä

(10) Patent No.: US 10,370,282 B2
(45) Date of Patent: Aug. 6, 2019

(54) METHOD AND APPARATUS FOR TEMPERING GLASS SHEETS

(71) Applicant: Glaston Finland Oy, Tampere (FI)

(72) Inventor: Harri Kylväjä, Pirkkala (FI)

(73) Assignee: GLASTON FINLAND OY, Tampere (FI)

( * ) Notice: Subject to any disclaimer, the term of this patent is extended or adjusted under 35 U.S.C. 154(b) by 43 days.

(21) Appl. No.: 15/596,546

(22) Filed: May 16, 2017

(65) Prior Publication Data

US 2017/0334760 A1    Nov. 23, 2017

(30) Foreign Application Priority Data

May 17, 2016 (EP) .................................... 16169900

(51) Int. Cl.
  *C03B 27/04* (2006.01)
  *C03B 27/044* (2006.01)
  *C03B 27/048* (2006.01)

(52) U.S. Cl.
  CPC ........ *C03B 27/0413* (2013.01); *C03B 27/044* (2013.01); *C03B 27/0404* (2013.01); *C03B 27/048* (2013.01)

(58) Field of Classification Search
  None
  See application file for complete search history.

(56) References Cited

U.S. PATENT DOCUMENTS

| | | |
|---|---|---|
| 3,364,006 A | 1/1968 | Newell et al. |
| 3,396,001 A | 8/1968 | Baker |
| 3,522,029 A * | 7/1970 | Carson ................. C03B 23/035 65/104 |
| 4,198,463 A | 4/1980 | Greenhalgh |
| 4,314,836 A | 2/1982 | Seymour |
| 4,400,194 A | 8/1983 | Starr |
| 4,444,579 A | 4/1984 | Dunn et al. |

(Continued)

FOREIGN PATENT DOCUMENTS

| | | |
|---|---|---|
| GB | 1 071 555 A | 6/1967 |
| GB | 1 424 954 A | 2/1976 |

OTHER PUBLICATIONS

Extended European Search Report dated Nov. 9, 2016, issued by the European Patent Office in the corresponding European Patent Application No. 16169900.4-1375. (10 pages).

*Primary Examiner* — Lisa L Herring
(74) *Attorney, Agent, or Firm* — Buchanan Ingersoll & Rooney PC (57) ABSTRACT

A method and an apparatus for tempering glass sheets. A glass sheet is heated to a tempering temperature and quenching is conducted by blasting cooling air to both surfaces of the glass sheet. The quenching of a top surface and a bottom surface of the glass sheet's both side portions is commenced earlier or is performed at the early stage of quenching more effectively than the quenching of a top surface and a bottom surface of the glass sheet's intermediate portion. As a result, the compression stress required for a desired tempering degree is established on both surfaces of the side portions earlier than on both surfaces of the intermediate portion. In order to achieve this, the cooling air enclosures above and below a glass sheet are provided with a subarea of weakened cooling effect.

11 Claims, 5 Drawing Sheets

(56) References Cited

U.S. PATENT DOCUMENTS

| | | | |
|---|---|---|---|
| 5,380,575 A * | 1/1995 | Kuster | B32B 17/10036 |
| | | | 296/84.1 |
| 6,064,040 A | 5/2000 | Muller et al. | |
| 6,192,710 B1 * | 2/2001 | Takeda | C03B 23/0254 |
| | | | 65/107 |
| 2002/0194872 A1 * | 12/2002 | Kato | C03B 27/0404 |
| | | | 65/114 |
| 2007/0122580 A1 * | 5/2007 | Krall, Jr. | C03B 27/02 |
| | | | 428/38 |
| 2009/0173106 A1 | 7/2009 | Boisselle | |
| 2012/0073327 A1 * | 3/2012 | Boisselle | C03B 27/0404 |
| | | | 65/115 |
| 2013/0019639 A1 | 1/2013 | Saito et al. | |

* cited by examiner

METHOD AND APPARATUS FOR TEMPERING GLASS SHEETS

The invention relates to a method for tempering thin planar glass sheets with a thickness of not more than 4 mm to the surface compression stress of at least 100 MPa in such a way that the glass sheet retains its planarity even after the tempering, said method comprising heating a glass sheet to a tempering temperature and conducting a quenching step by blasting cooling air with a blasting pressure of not less than 6 kPa and a blasting distance of not more than 30 mm to both surfaces of the glass sheet.

The invention relates also to an apparatus for tempering thin planar glass sheets with a thickness of not more than 4 mm to the surface compression stress of at least 100 MPa, said apparatus comprising a furnace heating glass sheets to a tempering temperature and including a conveyor track for glass sheets, and a quenching unit cooling glass sheets and including a conveyor track and cooling air enclosures set above and below the conveyor track and having cooling air blast openings in such a disposition that the cooling effect of a blast through the blast openings is directed to the top and bottom surfaces of a glass sheet across the entire width of the glass sheet moving in the quenching unit, the blast openings having a shortest blasting distance of not more than 30 mm from the surface of a glass sheet moving on the conveyor track and a blasting pressure of not less than 6 kPa.

Tempering furnaces for glass sheets, wherein the glass sheets are moving on top of rotating ceramic rollers rotating in a single direction or back and forth, and from where the same proceed at a tempering temperature along a roller track to a quenching unit downstream of the furnace, in which the quenching is conducted with air jets, are generally known and in service. The roller track-equipped furnace is called in the art for example a roller hearth furnace. A typical furnace temperature is about 700° C. and the temperature of air used for cooling is typically about the same as the air temperature outdoors or in a factory hall. Cooling air is supplied by a fan or a compressor.

In furnaces and quenching units based on air support technology, the glass sheet is floating while being supported by a thin air bed and only comes to contact with conveyor track rollers or other transport elements along one of its side edges. The glass sheet tempering machines based on air support technology are clearly less common and less known than roller track-equipped tempering machines. The furnace based on air support technology is called in the art for example an air support furnace. The objective of a tempering process is always the same regardless of how the glass sheet is supported. Regardless of the glass sheet supporting practice, it does not eliminate the subsequently described problem of bi-stability, which is resolved by the invention.

The typical tempering temperature for a glass sheet of 4 mm thickness, i.e. the temperature at which the glass proceeds from furnace to quenching unit, is 640° C. The glass tempering temperature can be lowered slightly as the glass thickness increases. The increase of tempering temperature enables the tempering of progressively thinner glass and reduces the cooling capacity required for quenching. On the other hand, merely increasing the tempering temperature from 640° C. to 670° C. establishes on the glass of 4 mm thickness a clearly higher strengthening or tempering degree, i.e. the compression stress at glass surface increases.

The glass arriving at a tempering process is excellent in terms of its straightness and optical properties. It has typically a glass surface compression stress of 1-4 MPa. It is an objective in the tempering process to provide the glass sheet with a sufficient increase of strength while compromising as little as possible its straightness and optical properties. In addition to strength, another desirable quality of tempered glass is safety in breaking. Non-tempered glass breaks into large pieces with a laceration hazard. Tempered glass breaks into almost harmless crumbs.

The compression stress established in tempering at glass surface (degree of strength or tempering) is dependent on the temperature profile of glass in thickness direction as the glass is cooling through a transition temperature range (about 600→500) typical for glass. In this case, the temperature profile in thickness direction assumes a more or less parabolic shape. The degree of tempering, the surface compression stress of at least 100 MPa, is developed in glass when the temperature difference in the temperature profile in thickness direction between the surface and the center of glass is at least about 100° C. Thinner glass requires more cooling effect for obtaining the same aforesaid temperature difference. For example, the tempering of 3 mm thick glass requires approximately 5 times more cooling fan motor capacity per glass area than the tempering of 4 mm thick glass. For example, the objective for a 4 mm thick glass sheet in tempering is the surface compression of about 100 MPa, whereby the center of glass thickness has a tensile stress of about 46 MPa. This type of glass sheet breaks into sort of crumbs that fulfill the requirements of safety glass standards.

An objective with so-called heat strengthened glass is not to achieve safe breaking characteristics, nor a strength as high (surface compression of about 50 MPa is enough) as in tempered glass. An objective with so-called super-tempered glass is a type of glass clearly stronger than normal tempered glass. In so-called FRG glass (fire resistant glass), for example, the surface compression stress is at least 160 MPa. Heat strengthening will be successful when the cooling effect of air jets in a quenching unit is markedly reduced with respect to tempering. Super tempering will be successful when the cooling effect of air jets in a quenching unit is markedly increased with respect to tempering. Other than that, as a process, heat strengthening and super tempering are similar to tempering. However, these differ from each other in the sense that the so-called bi-stability problem to be solved by the invention is slight or insignificant in the case of heat strengthened glass and readily solvable by the adjustment of furnace temperature, whereas no proper solution has been presented for the bi-stability problem occurring in the tempering and super-tempering of thin glasses with a thickness not more than 4 mm.

Figure 8:
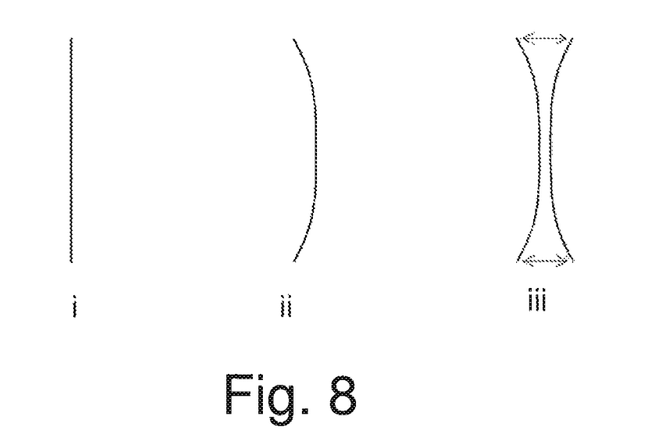
FIG. 8 shows the shape and bi-stability of glass as seen in the direction of a glass sheet's plane.

It is difficult to detect the warping and bi-stability of a glass sheet present on the rollers of an unloading track at the end of a tempering line as the glass is pressed by gravity to a flat condition against the roller track. The glass straightening effect of gravity disappears as the glass is hoisted to an upright position for example to rest with its side edge against the rollers. This allows for a visual inspection of the glass regarding the straightness of one of its side edges. The glass is visibly straight (see FIG. 8, glass i) or curved in one direction. There are standardized measuring methods and limit values for the curvature (overall flatness) of glass. Slight curving is not a problem. When bending glass while it is in an upright position, the stable glass (see FIG. 8, glass ii) always resumes the same shape after the bending force has disappeared. Bi-stable glass cannot be made straight in the upright position without an external force. When subjected to a force urging it slightly towards straightness, the bi-stable glass bends itself abruptly in the opposite direction to the same curvature as in the beginning. This self-inflicted bending can be perceived on the hands and the resulting sound is audible. Hence, the bi-stable glass has at least two optional shapes reachable thereby in an upright position (see FIG. 8, glass iii). The shape of a bi-stable glass sheet may also include local deformations resulting from the same phenomenon as the bi-stability.

The above-described bi-stability, along with the accompanying warping, is a tempered glass quality problem commonly known in the art. In practice, the tempered bi-stable glass sheet is not acceptable. In general, bi-stability is particularly demonstrated especially in the tempering of 3-4 mm thick glasses (tempering of thinner glasses is rare but becoming more common) when the glasses are relatively large in surface area (at least 0.5 m$^2$) and have a quadratic shape. In order to eliminate bi-stability, the tempering line operator typically adjusts heating of the furnace. Success in this undertaking generally entails that several pieces of glass go to waste as a result of bi-stability and/or related warping or as a result of some other quality defect inflicted by an adjustment procedure, if success can be reached at all. Success depends on the operator's skills and the capability of a furnace. As the glass thickness keeps reducing from 3 mm, the problem becomes more severe. In pre-invention tests, when tempering 2 mm glass, the problem was found so severe that its elimination by adjusting the furnace was no longer possible. The bi-stability problem also becomes more prominent as the size of a glass sheet increases, as the glass becomes more quadratic (i.e. as the length of glass approaches its width), and as the tempering degree of glass increases.

Publication GB 1 071 555 discloses a method and apparatus for producing a bent tempered glass sheet by conducting the bending through making use of unequal stresses generated intentionally in various areas and on opposite surfaces of the glass sheet. In an initial cooling section, just the upper surfaces of a glass sheet's end areas are subjected to cooling in order to produce a temporary upward curving of these areas. In the actual quenching section, the top and bottom surfaces of a glass sheet are subjected to cooling with unequal cooling effects for providing the glass sheet's opposite surfaces with unequal compression stresses and thereby achieving a desired curving or bending of the glass sheet. Accordingly, the purpose here is not to resolve the bi-stability problem of a flat glass sheet.

Publication U.S. Pat. No. 4,400,194 discloses a method and apparatus for heat-strengthening glass sheets. The desired surface compression stress is 24-69 MPa and the surface compression stress desired for side portions is higher than that desired for the intermediate portion. The purpose of this is to make strong side edges while the crack progressing time across the glass sheet is long. Thus, when breaking, the glass sheet remains in a window until it is replaced with a new glass sheet. Such a glass sheet does not break into almost harmless crumbs in the way of tempered glass. The apparatus is provided with baffles, which are set between nozzle pipe heads and a glass sheet and which in their intermediate portion prevent the cooling blast from reaching the glass and in their perforated edge portions allow the cooling blast. Hence, the objective is to provide a lesser surface compression stress on the intermediate portion than on the edge portions of a heat-strengthened glass sheet. On the other hand, in the process of tempering flat glass sheets, it is the objective to achieve an equal distribution of surface compression stress.

Bi-stability is a result of stresses existing in a glass sheet and differences thereof at various parts of the glass. In other respects, the theory regarding the development of bi-stabil-ity in a flat glass sheet is not generally known in the art. The invention is based on new empirical information. Benefits of the invention have been demonstrated in practical trials.

An objective of the invention is to provide a method and apparatus, enabling thin (thickness not more than 4 mm, especially less than 3 mm) large (more than 0.5 m$^2$, especially more than 1 m$^2$) tempered and super-tempered glass sheets to be made stable and straight.

This object is attained with a method of the invention on the basis of the characterizing features presented in the appended claim 1. The object is also achieved with an apparatus of the invention on the basis of the characterizing features presented in claim 4. Preferred embodiments of the invention are presented in the dependent claims.

The invention will now be described more closely with reference to the accompanying drawings, in which in FIG. 5. The figure defines a shortest blasting distance H.

Figure 1:
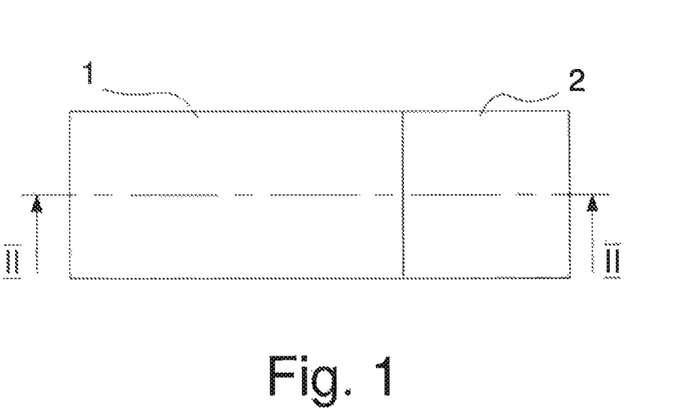
FIG. 1 shows sections of the apparatus schematically in a plan view.

The apparatus comprises a furnace 1 and a quenching unit 2, which are successive in a glass sheet traveling direction in said sequence according to FIG. 1. The furnace 1 is provided with typically horizontal rollers 5 or an air support table along with its conveyor elements. These make up a conveyor track for the glass sheet. A glass sheet G to be heated is driven continuously in the furnace at a constant speed in one direction or back and forth for the duration of a heating cycle. Having been heated to a tempering temperature, the glass sheet proceeds from the furnace 1 to the quenching unit 2 at a transfer speed W, which is typically higher than the motion speed of glass in the furnace 1. Typically, the transfer speed is 300-800 mm/s and remains constant at least for as long as the glass has cooled to below the aforesaid transition temperature range. For example, each part of a 3 mm thick glass is required to dwell in quenching at least for the period of about 3 seconds. At a transfer speed of 600 mm/s, for example, this would require a quenching unit 2 with a length of not less than about 1800 mm. In order to make the glass transfer time from furnace to quenching as short as possible, the distance from the furnace 1 to below a first cooling air enclosure 3 shall not be more than the thickness of an end insulation of the furnace plus 300 mm, preferably not more than 200 mm. Therefore, with the glass sheet motion speed of at least 300 mm/s, the transfer time for a leading edge of the glass from the furnace to below the first nozzle box will be not more than 1 s. With the motion speed of 400 mm/s and the transfer distance of 200 mm, the transfer time is 0.5 s. Preferably, the transfer speed is more than 500 mm/s and the distance in the glass traveling direction from the external surface of a downstream end of the furnace to the location of a first row of nozzle openings is less than 150 mm. Thereby, the glass has enough time to cool with natural convection and radiation as little as possible before quenching.

Figure 2:
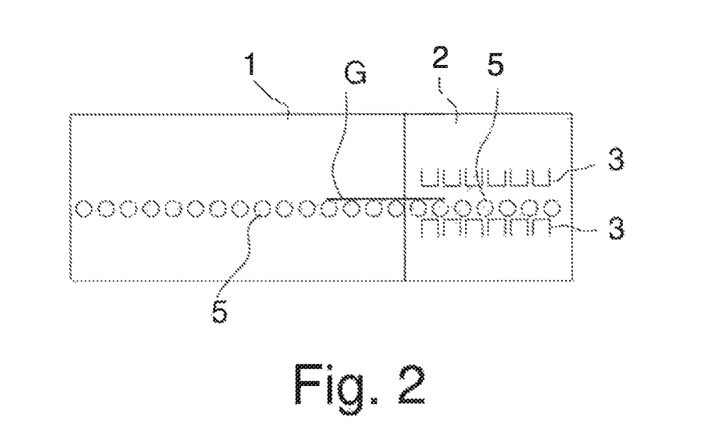
FIG. 2 shows the apparatus in a longitudinal section along a line II-II in FIG. 1.
Figure 3:
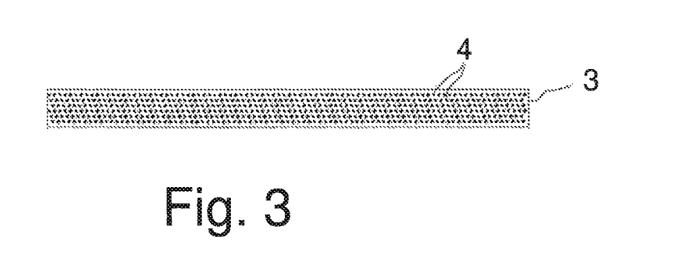
FIG. 3 shows a cooling air enclosure of the apparatus along with its blast openings.
Figure 9:
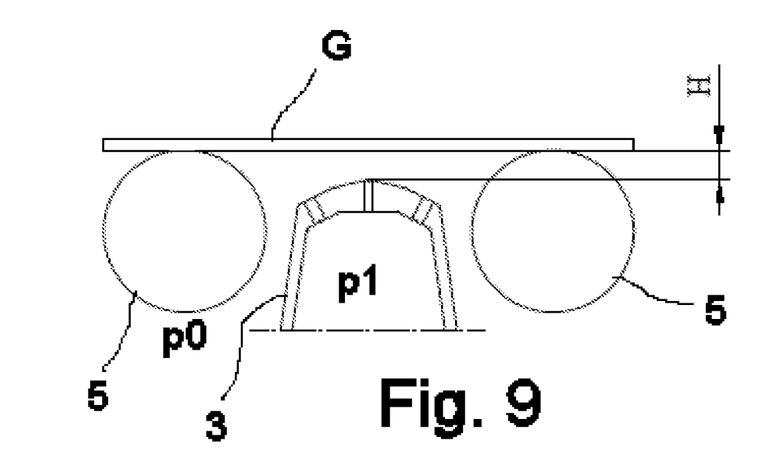
FIG. 9 shows two rollers and one partly underlying cooling air enclosure in a cross-section for a quencher different from that shown e.g.

The quenching unit 2 is provided with typically horizontal rollers 5 and cooling air enclosures 3 above and below the rollers, as in FIG. 2. When the furnace 1 is an air support surface, the rollers 5 or the air support table, along with its conveyor elements, are in the quenching unit 2 typically in a slightly inclined position relative to a horizontal direction transverse to a motion direction of the glass G. The cooling air enclosures 3 are provided with blast openings 4 from which the cooling air discharges in jets towards the glass G. The shortest blasting distance H of the blast openings 3 (see FIG. 9) is not more than 30 mm from the surface of a glass sheet moving on the conveyor track and the blasting pressure is at least 6 kPa, preferably 10 kPa or more. A blasting pressure dp is the difference between an absolute pressure p1 existing inside the cooling air enclosure and an absolute pressure p0 of the factory hall. With glass less than 2,8 mm in thickness, the blasting pressure is preferably more than 20 kPa and the shortest blasting distance is less than 15 mm. Achieved thereby is a heat transfer coefficient for the tempering of thin glasses, which in the case of 4 mm thick glass is more than 350 W/(m$^2$K), in the case of 3 mm thick glass more than 500 W/(m$^2$K), and in the case of 2 mm thick glass more than 700 W/(m$^2$K). The blast openings 4 are typically circular holes and typically set successively in rows, as in FIG. 3. The blast openings are typically less than 8 mm, and preferably 1-6 mm, in diameter. The blast openings 4 can also come in other shapes, for example in slot shapes.

Figure 4:
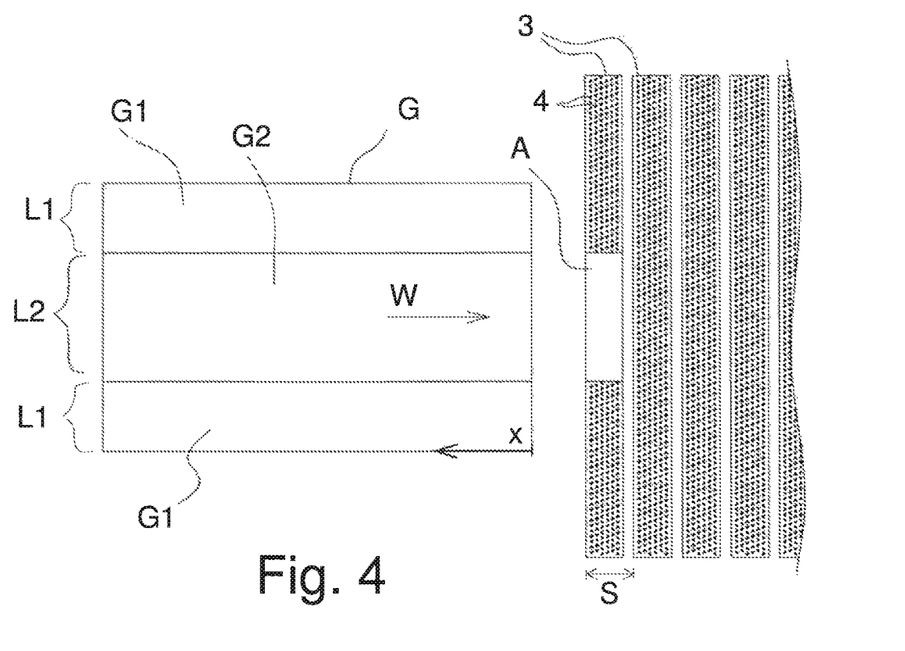
FIG. 4 shows schematically cooling air enclosures, along with blast openings thereof, for the apparatus according to a preferred embodiment of the invention, in a view from a direction normal to the glass surface.

FIG. 4 illustrates a glass sheet in the process of passing into a quenching unit 2 of the invention. In FIG. 4, the first cooling air enclosure 3 in the motion direction of glass comprises a subarea (A) weakened in terms of its cooling capacity, and thereby also in terms of its cooling effect, and having a width L2. The cooling capacity is adapted to be weaker as compared to the cooling capacity of the cooling air enclosures 3 outside the subarea (A) over a surface area equivalent to the subarea (A). This weakening of cooling capacity can be carried out e.g. by closing, spacing, or reducing the size of blast openings. In a lateral direction of glass (=a horizontal direction perpendicular to the motion direction of glass), the subarea (A) has a boundary which is sharp with respect to the rest of the area. The sharpness of the boundary can be moderated for example by adding inside the area (A), along its lateral edges (=edges adjacent to side portions G1 of the glass), blast openings 4 which are smaller than those outside the subarea A. The aforesaid sharpness of the boundary is also reduced by narrowing the width of the subarea (A) in the motion direction of a glass, because the glass is moving at the speed W and, therefore, a single row of blast openings 4 is not enough for tempering the glass.

The subarea A with a weakened cooling capacity is necessary in the cooling air enclosures 3 present above and below a glass sheet for the tempered glass sheet to be flat and straight. In the apparatus according to a preferred embodiment of the invention, the subarea (A) of weakened cooling capacity is substantially identical in cooling air enclosures 3 both above and below the glass sheet and is disposed symmetrically in the middle of a glass sheet in a direction perpendicular to the motion direction of the glass sheet. In the subarea (A), the cooling effect can also completely averted, but for the sake of consistency, what is subsequently discussed is a subarea weakened in terms of its cooling capacity or cooling effect. In the apparatus according to a preferred embodiment of the invention, the cooling air enclosures 3, and the cooling effects thereof, become in the motion direction of the glass G, after the subarea (A), identical to each other across the entire width of the glass G, as depicted in FIG. 4.

What will be discussed next is the transfer of a glass G to quenching in FIG. 4. In the weakened subarea (A) does not exist a cooling capacity sufficient for a desired degree of tempering, i.e. there occurs no quenching. Therefore, each unit length of an intermediate portion (G2) of the glass arrives at quenching a time period t=S/W later than the corresponding, i.e. the same x coordinate possessing unit length of a side portion (G1). Hence, the weakened subarea (A) delays the arrival of the intermediate portion (G2) of glass at quenching with respect to the side portions (G1). As a result, the side portions (G1) of glass cool down sooner and tempering stresses are generated therein earlier than in the intermediate portions (G2).

Figure 5:
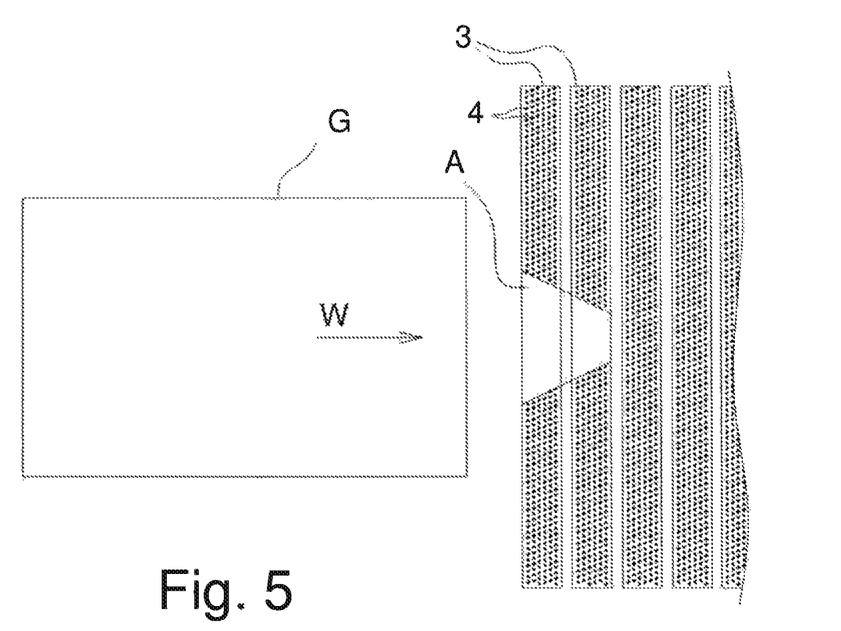
FIG. 5 shows a variant for the apparatus of FIG. 4.

FIG. 5 shows a subarea (A), which is weakened in terms of its cooling capacity and thereby also in terms of its cooling effect and which is established in two successive cooling air enclosures 3 and which becomes narrower in the traveling direction of glass. These cooling air enclosures 3 are at an upstream end of the quenching unit 2 as seen in the traveling direction of glass. Narrowing of the subarea (A) may occur in a stepwise or linear manner or as an intermediate thereof. The laterally directed profile of cooling capacity can also be changed in ways other than by changing the width of the subarea. Such ways include e.g. gradual changes of the size, density, or blowing direction of the blast openings 4 when progressing in the motion direction of glass and/or towards the side edges of the subarea (A).

Figure 6:
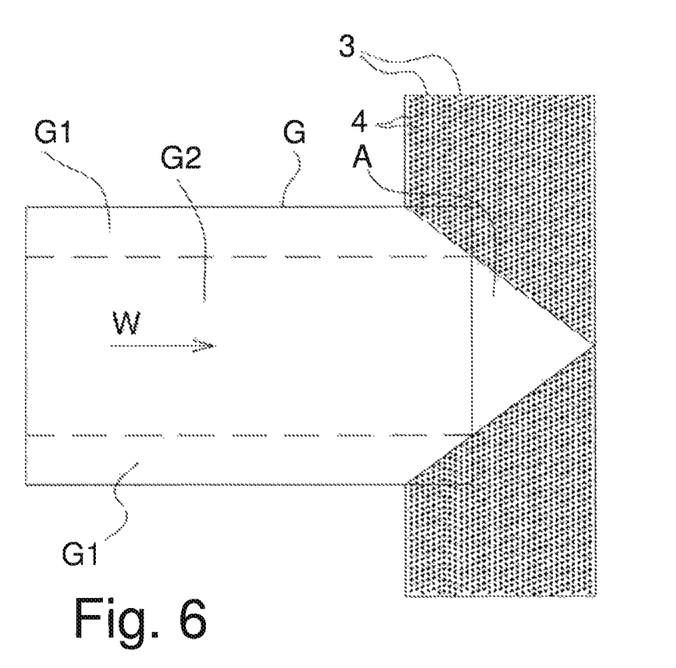
FIG. 6 shows a taper-shaped subarea A in a long blasting enclosure.

FIG. 6 shows a subarea (A), which becomes narrower in a taper-like manner in the traveling direction of a glass sheet and which is housed in a long blasting enclosure 3 covering the quenching section partially or completely. The subarea (A) is only present over a short stretch of the quenching unit's length of which only the initial portion is shown. Typically, the subarea (A) is located at a start of the quenching unit 2 over a distance of the first 0-60 cm and its length in the motion direction of glass is at least equal to the diameter of a blast opening and not more than 60 cm. This location of the subarea (A) applies also to the exemplary embodiments of FIGS. 4 and 5. The exemplary embodiment of FIG. 6 nevertheless differs from these in the sense that there is no distinct boundary between the side portions and the intermediate portion but, instead, the invention comes to fruition with arbitrarily selected portion widths. FIG. 6 shows in dashed lines a suggested selection for the side portions G1 and the intermediate portion G2. This and also other portion width selections fulfill a characterizing feature of the invention that the quenching of a top surface and a bottom surface of the side portions is commenced earlier or is performed at an early stage of quenching more effectively than the quenching of a top surface and a bottom surface of the glass sheet's intermediate portion. As a result, the compression stress required for a desired tempering degree is generated on both surfaces of the side portions earlier than on both surfaces of the intermediate portion.

Figure 7:
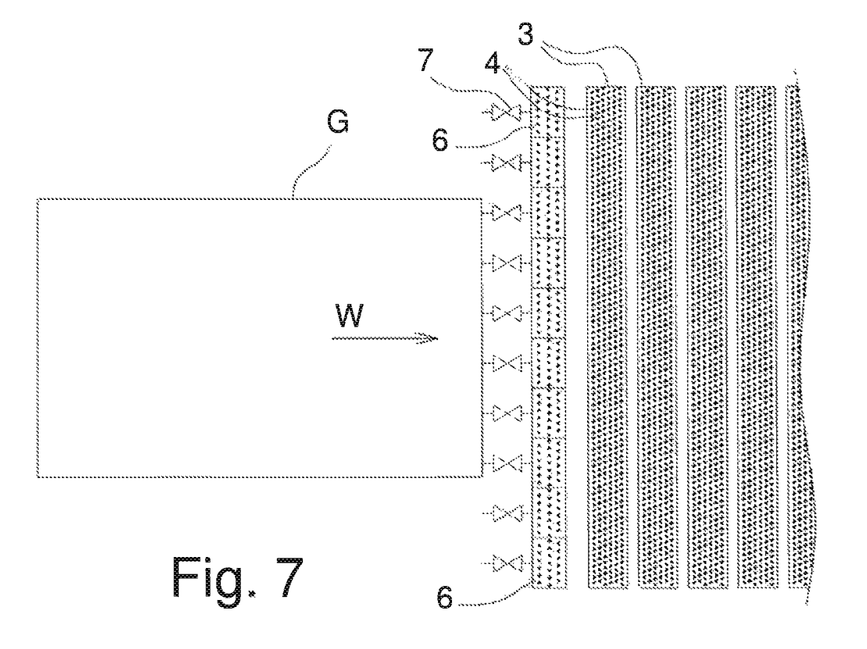
FIG. 7 shows a cooling air enclosure divided into sections 6, said sections being provided with valves 7.

In the exemplary embodiment of FIG. 7, the first blasting enclosure is divided into enclosure sections 6, which are provided with valves 7 that can be used for adjusting the amounts of cooling air to be blasted through the enclosure sections 6. In addition, by way of discrete inlets, the enclosure sections 6 can be supplied with cooling air whose temperature profile in a lateral direction of the quenching unit is as desired, particularly such that the weakening of cooling capacity is conducted entirely or partially by increasing the temperature of the blast locally in the subarea (A). The enclosure sections, placed successively in a direction perpendicular to the traveling direction of glass, are short, e.g. 5 cm, in a typical embodiment.

Furthermore, next described will be preferred or optional implementation practices of the invention, which, as appropriate, apply to all above-described embodiments.

The subarea (A) of weakened cooling effect has a width of not less than 20% with respect to the width of glass, but can be considerably larger, preferably more than 60%, even more than 90%, of the width of a glass sheet.

Quenching on the intermediate portion (G2) of a glass sheet advancing in the quenching unit is commenced on both surfaces of the glass sheet by at least the blast opening diameter of not more than 2 cm, even up to 60 cm, behind the side portions (G1). Preferably, on the intermediate portion (G2) of a glass sheet the quenching is commenced on both surfaces of the glass sheet 4-30 behind the side portions (G1) as the transfer speed W is 300-800 mm/s. In universally more valid terms, the quenching on a glass sheet's intermediate portion (G2) is started on both surfaces of the glass sheet 0,05-1 s later than on the side portions (G1).

In the motion direction of a glass sheet (G) downstream of the subarea (A) adapted to be weaker in terms of its cooling capacity, the cooling arrangement and the cooling effect achieved thereby are substantially identical across the entire width of the glass sheet (G). This is necessary for enabling the surface compression stress of at least 100 MPa, required for tempering, to be distributed as evenly as possible across the entire surface area of the glass sheet.

In the subarea (A) of weakened cooling capacity and effect, the total surface area of blast openings 4 can be smaller than the total surface area of blast openings included in a similar size area of the cooling air enclosure outside the subarea. The reduction of a total surface area of the openings can be effected by reducing the diameter of blast openings 4 and/or by reducing the number of blast openings 4 and/or by closing some blast openings 4 completely or partially.

The weakening of cooling capacity can be effected completely or partially by reducing the discharge pressure of blasting jets in the subarea (A) that has been weakened in terms of its cooling capacity. The weakening of cooling capacity in the subarea (A) can be effected completely or partially by means of a barrier placed in the way of blasting jets discharging from the blast openings 4. This also provides a possibility of adjusting the weakening of cooling capacity as the barrier is adapted to be movable either manually or automatically. The same applies also to implements, such as a displaceable damper, used for closing the blast openings partially or completely.

It is also possible that the weakening of cooling capacity be effected completely or partially by increasing a blasting distance between the blast openings (4) in the subarea (A) and the glass (G) as compared to a blasting distance outside the subarea (A). This arrangement can be brought about by increasing a vertical distance between the glass (G) and the blasting jets and/or by changing the direction of blasting jets.

The heat transfer coefficient produced by blasting on the side portions (G1) of a glass sheet in a lateral direction of the quenching unit (2) on both sides of the weakened subarea (A) is substantially equal to the heat transfer coefficient of the rest of the quenching unit (2) to the glass, and the heat transfer coefficient produced by blasting in the weakened subarea (A) on the intermediate portion (G2) of a glass sheet is on average at least 20% lower than that. Outside the weakened subarea (A), the heat transfer coefficient is more than 350 W/(m²K), preferably more than 500 W/(m²K).

It is beneficial that, in a direction perpendicular to the motion direction of a glass sheet, the subarea (A) of weakened heat transfer be located substantially symmetrically in the middle of the glass sheet. It is also preferred that the subarea (A) of weakened heat transfer be substantially identical on both surfaces of a glass sheet. This assists in achieving the bi-stability of a flat glass sheet.

The cooling capacity of a blast occurring by way of the blast openings (4) is preferably adapted to be such that, as a result thereof, both surfaces of a glass sheet are permanently left with a substantially equal compression stress with a magnitude of at least 100 MPa.

In order to avoid unnecessary differences in compression stresses, it is preferred that the cooling capacity and the cooling effect in a lateral direction of the glass (G) not undergo an abrupt change at the boundary of the weakened subarea (A) but, instead, the cooling capacity and the cooling effect are adapted to be of a gradually changing type. This gradual changing can be promoted for example by adapting the width of the weakened subarea (A) and/or the profile of cooling effect to be variable in the motion direction of glass.

EXAMPLE

When, for example in glass with a thickness of 2,1 mm, the heat transfer coefficient produced by blasting is 1000 W(m²K), blasting air temperature is 30° C., glass tempering temperature is 690° C., glass motion speed is W=600 mm/s, and quenching commences on the intermediate portion 7,2 cm after the side portions, the surface of glass in the side portions has cooled 88° C. (to the temperature of 602° C.) and the entire glass thickness on average 23° C. (to the average temperature of 667° C.) by the time the quenching of glass only begins on the intermediate portion of the glass.

The invention would perhaps be unnecessary should the entire surface area of glass cool through the aforesaid transition temperature range in an exactly consistent manner (i.e. at the same speed, simultaneously, and with a consistent temperature profile in the thickness direction), thereby not developing stress differences in the direction of glass surface either. In this case, the tempering stresses would also be established across the entire glass surface area at exactly the same time. In practice, the aforesaid exact simultaneity does not occur. With the invention, the glass is subjected to tempering stresses in such a sequence which, according to practical experiments, is correct from the standpoint of eliminating bi-stability.

In this disclosure, the length direction of a quenching unit or a glass sheet is a direction parallel to the glass sheet's motion. The start of a quenching unit is a part of the quenching unit at which the glass is to arrive first. The lateral direction of a glass sheet or a quenching unit is a horizontal direction perpendicular to the glass sheet's motion direction. In the foregoing, the intermediate portion of a glass sheet refers to a central section of the glass sheet co-directional with its motion, and the side portion refers to a part of the side edge co-directional with the glass sheet's motion. The cooling capacities (unit W/m²) needed for tempering fluctuate a great deal, depending on the thickness of and the tempering degree desired for a glass sheet. Therefore, the invention involves the examination of relative cooling capacities in various parts of the quenching unit. Thus, because the issue is not about absolute but, instead, relative cooling capacities, it is just as relevant to speak about cooling effects in various parts of the glass sheet. Accordingly, when speaking about cooling capacity, it is actually cooling efficiency and cooling effect that are meant at the same time. The heat transfer coefficient is obtained by dividing the cooling capacity with the temperature difference between glass and air.

The invention claimed is:

1. An apparatus for tempering thin planar glass sheets with a thickness of not more than 4 mm to a surface compression stress of at least 100 MPa, said apparatus comprising:
 a furnace for heating glass sheets to a tempering temperature, the furnace including a conveyor track for glass sheets, and
 a quenching unit for cooling glass sheets, the quenching unit including a conveyor track and cooling air enclosures set above and below the quenching unit conveyor track and having cooling air blast openings in such a disposition that a cooling effect of a blast through the blast openings is directed to the top and bottom surfaces of a glass sheet across the entire width of the glass sheet moving in the quenching unit,
 wherein the blast openings have a shortest blasting distance of not more than 30mm from the surface of the glass sheet moving on the quenching unit conveyor track and a blasting pressure of not less than 6 kPa,
 wherein, in order to eliminate or reduce the bi-stability of a tempered flat glass sheet, at least a first cooling air enclosure above the quenching unit conveyor track includes a subarea of weakened or blocked cooling effect and at least a first cooling air enclosure below the quenching unit conveyor track includes a subarea of weakened or blocked cooling effect,
 wherein said subareas having a weakened or blocked cooling effect as compared to the cooling effect of cooling air enclosures outside the subareas over a surface area of cooling air enclosures equivalent to the subareas, the subareas being located above and below an intermediate portion of the moving glass sheet,
 whereby quenching of a top surface and a bottom surface of opposing side portions of the glass sheet commences earlier or more effectively than the quenching of a top surface and a bottom surface of the intermediate portion of the glass sheet, as a result of which the opposing side portions are provided, prior to the intermediate portion, with a temperature profile in the glass thickness direction which generates a tempering degree having the surface compression stress of at least 100 MPa,
 wherein quenching of the intermediate portion is commenced on both the top and bottom surfaces of the glass sheet not more than 30 cm after the opposing side portions, and
 wherein a distance from the furnace to below the first cooling air enclosure is not more than a thickness of an end insulation of the furnace plus 300 mm and the glass sheet has a motion speed of at least 300 mm/s, whereby a transfer time for a leading edge of the glass sheet from the end insulation of the furnace to below the first cooling air enclosures is not more than 1 s.

2. An apparatus according to claim 1, wherein the subareas of weakened cooling effect are located at a start of the quenching unit over a distance of the first 0-60 cm and the subareas have a length in the motion direction of glass which is not less than a diameter of a cooling air blast opening and not more than 60 cm.

3. An apparatus according to claim 1, wherein on the intermediate portion, which is included in the glass sheet advancing in the quenching unit and whose width is at least 50% of the width of the glass sheet, quenching is commenced on both the top and bottom surfaces of the glass sheet at least 4 cm after the opposing side portions.

4. An apparatus according to claim 1, wherein, in the motion direction of the glass sheet downstream of the subareas of weakened cooling effect, the cooling arrangement and a cooling effect generated thereby are substantially identical across the entire width of the glass sheet.

5. An apparatus according to claim 1, wherein, in the subarea of weakened cooling effect, the blast openings have a total surface area which is smaller than the total surface area of blast openings included in a similar size area of the cooling air enclosure outside the subarea, and that the reduction of surface area is effected by reducing a diameter of the blast openings and/or by reducing a number of blast openings and/or by closing some blast openings completely or partially.

6. An apparatus according to claim 1, wherein the subareas having weakened or blocked cooling effect are completely or partially effected by means of a barrier placed in the way of blasting jets discharging from the blast openings.

7. An apparatus according to claim 1, wherein the subareas having weakened or blocked cooling effect are effected by increasing a blasting distance between the blast openings in the subareas and the glass sheet as compared to a blasting distance outside the subareas.

8. An apparatus according to claim 1, wherein the intermediate portion of the glass sheet has a width of at least 5 cm, each of the opposing side portions of the glass portion has width of at least 5 cm, and the subareas of weakened cooling effect have a width of at least 20% with respect to the width of the glass sheet.

9. An apparatus according to claim 1, wherein a heat transfer coefficient produced by blasting on the opposing side portions of a glass sheet in a lateral direction of the quenching unit on both sides of the subareas are substantially equal to a heat transfer coefficient of the rest of the quenching unit on the glass sheet, and a heat transfer coefficient produced by blasting in the subareas on the intermediate portion of a glass sheet is on average at least 20% lower than that.

10. An apparatus according to claim 1, wherein, in a direction perpendicular to a motion direction of a glass sheet, the subareas lie substantially symmetrically in the middle of the glass sheet and the subareas are substantially consistent on both the top and the bottom surfaces of the glass sheet.

11. An apparatus according to claim 1, wherein a cooling effect in a lateral direction of the glass sheet does not change abruptly at a boundary of the subareas, but the cooling effect is adapted to be of a gradually changing type.

* * * * *